April 11, 1939.  J. H. MILLAR  2,154,134
COLLECTOR FOR CENTRIFUGAL APPARATUS
Filed March 18, 1936
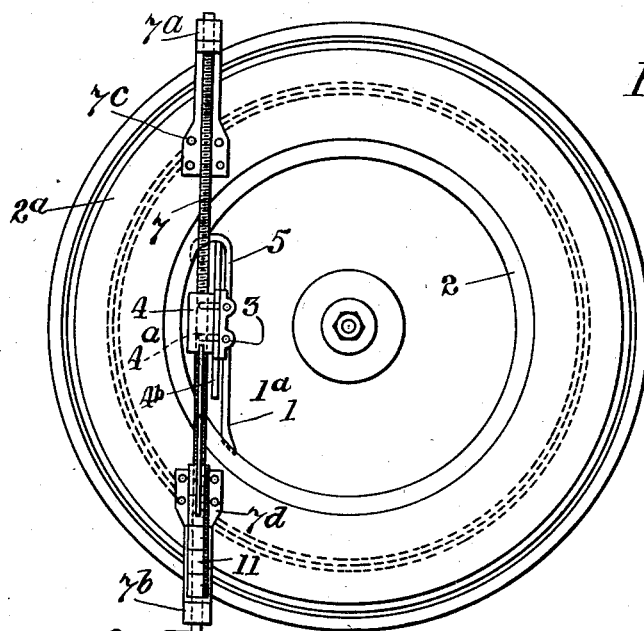
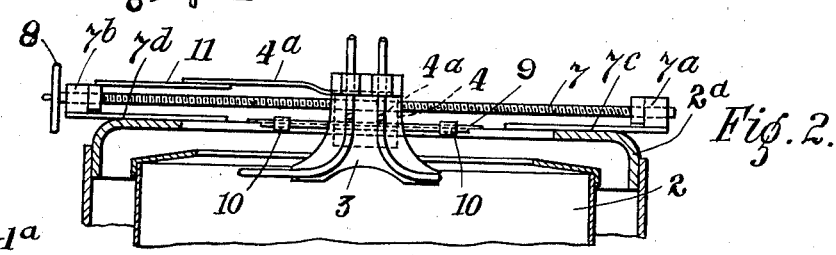
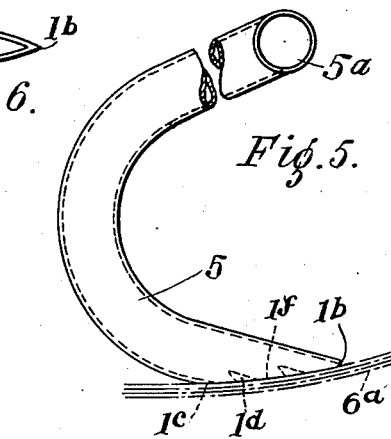

Patented Apr. 11, 1939

2,154,134

UNITED STATES PATENT OFFICE 2,154,134

COLLECTOR FOR CENTRIFUGAL APPARATUS

James Hill Millar, Dublin, Irish Free State, assignor to Arthur Guinness, Son and Company Limited, London, England Application March 18, 1936, Serial No. 69,501
In Irish Free State June 22, 1934

3 Claims. (Cl. 233—22)

This invention relates to centrifugal apparatus, its object being to provide an improved form of collector for use in such apparatus. An object of the invention is to provide a collector adapted to collect a liquid, such as yeast extract, which is prone to form froth, without the formation of froth. A further object of the invention is to provide a collector, for use in centrifuge wherein under centrifugal action there is an inner stratum of liquid prone to frothing, such as yeast extract, and an outer stratum of sludge, and for removing the liquid continuously at an increasing radius as the surface recedes owing to the removal of the liquid without causing frothing or causing appreciable disturbance of the sludge even when the liquid has been substantially removed and the collector is therefore very close to the surface of the sludge.

A further object of the invention is to provide a collector whose collecting mouth is curved to a curvature at least as great as the maximum curvature of the surface of the liquid, that is, the curvature of the surface of the liquid at the commencement of the collecting operation.

A further object is to provide a collector of thin blade-like shape having sharp leading and trailing edges and which increases gradually in width to its major axis, the blade cross section being of thin double convex form with the curvature of the walls adapted to keep down disturbance and wave and "wake" formation in the liquid to a minimum.

The accompanying drawing shows collecting devices in accordance with this invention and, by way of example, their application to a centrifuge.

Fig. 1 is a plan view of a centrifuge showing two of the collectors applied thereto and showing control gear therefor.

Fig. 2 is a cross sectional view of the upper portion of a centrifuge and showing the collector control gear in elevation.

Figs. 3 and 4 are respectively plan and end views of a collector blade to an enlarged scale, for separated and/or filtered liquid.

Figs. 5 and 6 are respectively plan and end views of a larger form of collector blade for collecting sludge from a centrifuge.

Referring to the drawing:

The collector comprises a hollow blade 1 forming the end of a conduit 1ª, the blade 1 having sharpened leading and trailing edges 1ᵇ and 1ᶜ giving a stream-lined effect that is, the cross section of the blade (Fig. 4) is of thin double convex shape increasing in width from the sharp edges to a central major axis in such manner that the curvature of the side walk is very gradual and there is no sudden displacement of the liquid. Thus wave and "wake" formation and consequent frothing and splashing is reduced to a minimum. The intake or collecting edge, or mouth, is submerged in the liquid spinning in the centrifuge bowl 2 thus preventing the inclusion of air and preventing the formation of froth. The edges of the collecting mouth regarded in plan as in Figs. 3 and 5 are curved to a radius less or not greater than the radius of the surface of the liquid when the machine has received the full charge of yeast extract, that is, when the surface of the liquid is at the minimum radius and has its maximum curvature. This radius increases as the surface recedes due to the collection of the liquid and an accurate screw adjustment and scale, as described later, are provided to enable the collector to be adjusted to follow the receding liquid. This curvature of the mouth also serves to keep the disturbance of the liquid and the consequent effects that is, frothing and wave and wake formation down to a minimum. The interior of the collecting blade 1 has a series of division members or vanes 1ᵈ leading inwardly from ports 1ᶠ on its collecting edge and arranged at the best angle ( say 45°) to deflect the flow of liquid into the ports with the least possible disturbance of the sediment in the centrifuge bowl. Owing to its being shaped and dimensioned as above described to avoid disturbance of the liquid the collector is not of sufficient cross sectional area to collect the liquid at a practical and economic rate. Hence the provision of the vanes but these are so arranged as not to increase the rate of intake to such an extent that the inward rush of liquid to take the place of the "groove" of liquid scooped up by the collector is such as to cause appreciable wave formation and consequent disturbance. The conduit 1ª is secured to a bracket 3 removably carried by a member 4 having holes therein adapted to receive pins 4ª projecting from the member 4 (see Fig. 2).

For removing insoluble sediment or sludge from the centrifuge bowl another collector 5, Figs. 5, 6, is provided and is also carried by the bracket 3. The blade of this collector is similar to the blade shown at Figs. 3 and 4 except that the ports in its mouth or collecting edge are larger. This collector 5 is formed in one with a pipe or conduit 5ª leading the sludge or sediment from the centrifuge. The dotted lines and arrows at 6 and 6ª indicate the direction of flow of the spinning liquid in the centrifuge.

The collectors 1 and 5 are kept submerged in the liquid during collection by screw control gear consisting of the screw 7, the bracket carrying member 4 which engages the screw and an operating wheel 8. The screw 7 is mounted in bearings 7a and 7b carried by brackets 7c, 7d, secured to the top inwardly projecting flange 2a of the centrifuge casing. By this arrangement the bracket carrying member 4 can be moved to keep the collecting edge or mouth of the collector 1 submerged in the liquid to give sharp separation and to take only clear or separated liquid. The bracket 4 can be moved to keep the collecting edge or mouth of the sludge or sediment collector 5 immersed in the sludge or sediment after the clear or separated liquid has been collected. The submersion of the collecting blade or mouth, in either case, prevents the inclusion of air and the formation of froth.

Below the screw 7 is a rod 9 which is secured to the top inwardly projecting flange 2a of the centrifuge and carries stops 10 (see Fig. 2) to limit the outward movement of the collectors. The bracket carrying member 4 has secured thereto an indicating member 4b adapted to move over a graduated scale 11 for indicating the position of the collectors and for their accurate adjustment into the liquid. When the screw 7 is turned in one direction the collector 1 will be moved into collecting position, at the same time taking the collector 5 out of action and clear of the liquid spinning in the centrifuge. It will be understood that in some cases only a single collector may be necessary and in other cases more than two collectors may be provided with suitable control gear.

The collector hereinbefore described will give sharp separation of an extract from insoluble matter as described in my co-pending application No. 25,216 filed on June 6, 1935, and is particularly adapted for use in the process described therein.

The term "liquid" as used in the following claims is to be understood as covering flowable substances such, for example, as sludge.

I claim:

1. In a centrifugal separator having a rotating bowl, a device for collecting liquids prone to frothing, said device comprising a conduit terminating in a hollow blade of narrow elongated cross-section, having its major width at a point substantially centrally of the blade and tapering gradually from said major width into leading and trailing edges, said blade terminating in a mouth having a cross-sectional shape corresponding to that of the blade cross-section and being smoothly curved in the direction of elongation of the blade, means for supporting said blade with its mouth wholly below the surface of the liquid and the curvature of the mouth substantially parallel to the wall of the bowl, and spaced deflecting vanes located wholly within the blade adjacent the mouth thereof and in an inclined position with their outer edges at right angles to the major axis of the mouth and nearer the leading edge of the blade than their inner edges.

2. A liquid collecting device, as claimed in claim 1, in which said collecting mouth is curved to a curvature having a radius not greater than the minimum radius of the surface of the liquid to be collected.

3. A liquid collecting device, as claimed in claim 1, in which said support means for the collector blade and conduit comprises a carrier to which the conduit is secured, and screw means for traversing said carrier and adjusting the position of said mouth with reference to the receding surface of the liquid.

JAMES HILL MILLAR.